United States Patent
Levy et al.

(10) Patent No.: US 12,489,260 B2
(45) Date of Patent: Dec. 2, 2025

(54) MULTI-LAYERED FLEXIBLE BUS BAR

(71) Applicant: Stafl Systems, LLC, South San Francisco, CA (US)

(72) Inventors: Benjamin Michael Levy, Oakland, CA (US); Andrew Kenji McIntosh, San Francisco, CA (US); Kadir Toksoy, San Mateo, CA (US)

(73) Assignee: STAFL SYSTEMS, LLC, South San Francisco, CA (US)

( * ) Notice: Subject to any disclaimer, the term of this patent is extended or adjusted under 35 U.S.C. 154(b) by 0 days.

(21) Appl. No.: 18/525,094

(22) Filed: Nov. 30, 2023

(65) Prior Publication Data

US 2025/0183604 A1   Jun. 5, 2025

(51) Int. Cl.
*H01R 25/14*   (2006.01)
*H01R 43/16*   (2006.01)

(52) U.S. Cl.
CPC ........... *H01R 25/145* (2013.01); *H01R 43/16* (2013.01)

(58) Field of Classification Search
None
See application file for complete search history.

(56) References Cited

U.S. PATENT DOCUMENTS

| | | | | |
|---|---|---|---|---|
| 3,726,988 A | * | 4/1973 | Davis | H02G 5/06 |
| | | | | 174/68.2 |
| 4,142,224 A | * | 2/1979 | Wilson | H02B 1/21 |
| | | | | 361/624 |
| 5,274,195 A | * | 12/1993 | Murphy | H05K 3/4092 |
| | | | | 174/268 |
| 5,434,749 A | * | 7/1995 | Nakayama | H05K 3/202 |
| | | | | 439/949 |
| 6,051,782 A | * | 4/2000 | Wagner | H01R 9/226 |
| | | | | 174/541 |

(Continued)

FOREIGN PATENT DOCUMENTS

| | | | | |
|---|---|---|---|---|
| CN | 105825958 A | * | 8/2016 | |
| WO | WO-2012118047 A1 | * | 9/2012 | ........ H01M 10/6553 |
| WO | WO-2017018278 A1 | * | 2/2017 | ............... H01B 5/02 |

OTHER PUBLICATIONS

GALCO; Socomec Innovative Power Solutions; Socomec Wire & Cable; www.galco.com. (believed to have been available at least as early as Apr. 23, 2023).

*Primary Examiner* — Krystal Robinson
(74) *Attorney, Agent, or Firm* — Brad Bertoglio; Intelink Law Group, PC

(57) ABSTRACT

A flexible bus bar system for connecting printed circuit boards (PCBs), especially suited for high-power applications. The bus bar is constructed from multiple stacked thin sheets of conductive material, imparting flexibility and reducing mechanical stress on connected PCBs in applications prone to shock and/or vibration, such as electric vehicle power systems. The sheets may be laser-cut, optionally enabling formation of intricate geometries and/or integrated direct mounting apertures, potentially eliminating the need for additional connectors or crimps. One or more radiused curves are introduced into a central portion of the bus bar, holding the layers in alignment and providing flexibility and/or elasticity. The assembly may be reinforced with an adhesive-backed heat shrink. Methods of fabrication are also disclosed.

20 Claims, 9 Drawing Sheets

(56) References Cited

U.S. PATENT DOCUMENTS

| | | | | |
|---|---|---|---|---|
| 6,180,885 B1* | 1/2001 | Goldman | ................ | H02G 5/06 |
| | | | | 174/68.2 |
| 6,677,527 B2* | 1/2004 | Brannmark | .......... | H02B 13/005 |
| | | | | 174/70 B |
| 8,721,368 B2* | 5/2014 | Zhao | ...................... | H01R 11/01 |
| | | | | 439/627 |
| 8,859,897 B2* | 10/2014 | Hadi | ...................... | H01R 25/14 |
| | | | | 174/70 B |
| 9,853,435 B1* | 12/2017 | Burkman | .......... | H01M 10/6551 |
| 10,894,346 B2* | 1/2021 | Ma | .................... | B29C 45/14336 |
| 11,139,646 B2* | 10/2021 | Koizumi | .............. | H01B 7/0018 |
| 11,437,688 B2* | 9/2022 | Fabre | ....................... | H01R 4/48 |
| 11,488,742 B2* | 11/2022 | Dawson | ............... | H01B 13/003 |
| 11,862,358 B2* | 1/2024 | Dawson | ............... | H01M 50/505 |
| 2010/0248010 A1* | 9/2010 | Butt | ....................... | H01M 10/42 |
| | | | | 429/160 |
| 2010/0319958 A1* | 12/2010 | Latimer | ................. | H02G 5/005 |
| | | | | 174/110 D |
| 2021/0083402 A1* | 3/2021 | Castonguay | ........... | H01R 4/182 |

* cited by examiner

MULTI-LAYERED FLEXIBLE BUS BAR

TECHNICAL FIELD

The present invention relates generally to electrical interconnects, and more specifically to a multi-layered flexible bus bar adapted for connecting printed circuit boards (PCBs), especially in high-power applications such as battery packs and electric vehicle power systems.

BACKGROUND

In modern electronic systems, efficient power distribution between PCBs is paramount, especially in high-power applications like battery packs and electric vehicle power systems.

Solid bus bars formed from copper or other conductive materials are commonly used for these high-power connections due to their excellent electrical conductivity. However, traditional bus bars have limitations, such as being mechanically stiff. This stiffness, lack of or flexibility, can cause undue mechanical stress on the PCBs and weld joints to which the bus bars are attached, especially in systems subject to shock and vibration during usage such as vehicles.

Heavy-gauge cabling can also be used for high-power electrical connections. However, some such cabling (especially, e.g., solid conductor cabling) can also be mechanically stiff. If a braided wire is used to provide some increased amount of mechanical flexibility, such cables typically require connectors on each end for mounting to a PCB. Fabrication of such cables with connectors may increase cost and complexity. Also, connector-cable interfaces, such as crimp connections, may be subject to failure (e.g. at a crimp point) during manufacture, and/or during field usage.

Moreover, when manufacturing bus bars using traditional techniques, forming precise geometries can be a challenge. Traditional manufacturing processes like stamping may not offer the versatility required for creating intricate and customized geometries on a bus bar, thus limiting the adaptability of the bus bar to different system designs.

Therefore, there is a need in the art for a mechanically flexible bus bar that can support high current flows, minimize mechanical stress from shock and vibration of connected components, have direct PCB mounting capabilities, and/or be manufactured with versatile and precise geometries suitable for different system designs.

SUMMARY

In some aspects, the techniques described herein relate to a flexible bus bar including: a plurality of stacked conductive sheets; each of said stacked conductive sheets having a plurality of curves formed in a central portion thereof; each of said stacked conductive sheets having at least a first mounting point on a first side of the central portion, and at least a second mounting point on a second side of the central portion opposite the first side, each of the first and second mounting points configured for electrically-conductive attachment to a printed circuit board (PCB).

In some aspects, the techniques described herein relate to a flexible bus bar, in which the plurality of stacked conductive sheets are formed from metal, such as copper sheeting.

In some aspects, the techniques described herein relate to a flexible bus bar, in which the first mounting points include a first set of aligned holes passing through a portion of the stacked conductive sheets on the first side of the central portion. The second mounting points may include a second set of aligned holes passing through a portion of the stacked conductive sheets on the second side of the central portion. As such, a terminal mounted to a first PCB may be passed through the first set of aligned holes for acceptance of a fastener to secure the first side to the first PCB; and a terminal mounted to a second PCB may be passed through the second set of aligned holes for acceptance of a fastener to secure the second side to the second PCB.

In some aspects, the techniques described herein relate to a flexible bus bar, in which the plurality of curves includes three curves. In some aspects, the techniques described herein relate to a flexible bus bar, in which the plurality of curves includes three curves, formed such that the first side of the flexible bus bar is coplanar with the second side of the flexible bus bar. In other aspects, the first side of the flexible bus bar occupies a first plane, and the second side of the flexible bus bar occupies a second plane, and the first plane is parallel to and offset from the second plane. In some aspects, the curves cause the central portion to extend in a single direction relative to a plane occupied by the first side and second side of the bus bar. In some aspects, the techniques described herein relate to a flexible bus bar, wherein the central portion is curved to form a sinusoid or portion thereof, or a U shape form.

In some aspects, the techniques described herein relate to a flexible bus bar, wherein the plurality of stacked conductive sheets includes four conductive sheets. In some aspects, the techniques described herein relate to a flexible bus bar, wherein the plurality of stacked conductive sheets includes a number of conductive sheets between 2 and 6.

In some aspects, the techniques described herein relate to a flexible bus bar, wherein the plurality of stacked conductive sheets are each 0.010 inches in thickness. In some aspects, the techniques described herein relate to a flexible bus bar, wherein the plurality of stacked conductive sheets each have a thickness in the range of 0.008 inches to 0.020 inches.

In some aspects, the techniques described herein relate to a method for fabricating a flexible bus bar. The method may include: forming a plurality of flat conductive sheets from metal sheet stock; arranging the plurality of flat conductive sheets to form an aligned stack; clamping a first end of the stack; and press-forming at least one curve into a central portion of the stack. Forming a plurality of flat conductive sheets may also include laser cutting each of the flat conductive sheets from the metal sheet stock. In some aspects, the techniques described herein relate to a method, wherein forming a plurality of flat conductive sheets further includes laser-cutting at least one mounting hole on each of a first end and a second end, on each flat conductive sheet.

In some aspects, the techniques described herein relate to a method, wherein arranging the plurality of flat conductive sheets to form an aligned stack includes aligning first ends of each of the flat conductive sheets.

In some aspects, the techniques described herein relate to a method, wherein each of the flat conductive sheets includes at least one mounting hole formed on a first side of the central portion, and at least one mounting hole formed on a second side of the central portion; and the step of arranging the plurality of flat conductive sheets to form an aligned stack includes aligning each of the mounting holes formed on a first side of the central portion with one another.

In some aspects, the techniques described herein relate to a method, in which the step of press-forming at least one curve into a central portion of the stack includes press-forming three curves arranged such that a portion of the flexible bus bar on a first side of the central portion is coplanar with a portion of the flexible bus bar on an opposite, second side of the central portion. In some aspects, the techniques described herein relate to a method, in which the step of press-forming at least one curve into a central portion of the stack includes press-forming a curve including a sinusoid or portion thereof into the central portion.

In some aspects, the techniques described herein relate to a method, wherein the step of arranging the plurality of flat conductive sheets to form an aligned stack comprises installing the flat conductive sheets on a press tool base, the press tool base having alignment tabs passing through one or more holes in a first side of each of the flat conductive sheets, while leaving a second side of the flat conductive sheets opposite the first unsecured to the press tool base; and the step of press-forming at least one curve into a central portion of the stack comprises applying pressure to the flat conductive sheets to deform a central portion of the stack into a depression in the press tool base.

In some aspects, the techniques described herein relate to a method, wherein the plurality of flat conductive sheets includes four sheets. In some aspects, the techniques described herein relate to a method, wherein the plurality of flat conductive sheets each have a thickness in the range of 0.008" and 0.020".

BRIEF DESCRIPTION OF THE DRAWINGS

The accompanying drawings, which are incorporated into this specification, illustrate one or more exemplary embodiments of the inventions disclosed herein and, together with the detailed description, serve to explain the principles and exemplary implementations of these inventions. One of skill in the art will understand that the drawings are illustrative only, and that what is depicted therein may be adapted based on the text of the specification and the spirit and scope of the teachings herein. It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the drawings, in which non-limiting examples are illustrated, where like reference numerals refer to like reference in the specification.

DETAILED DESCRIPTION

Figure 1:
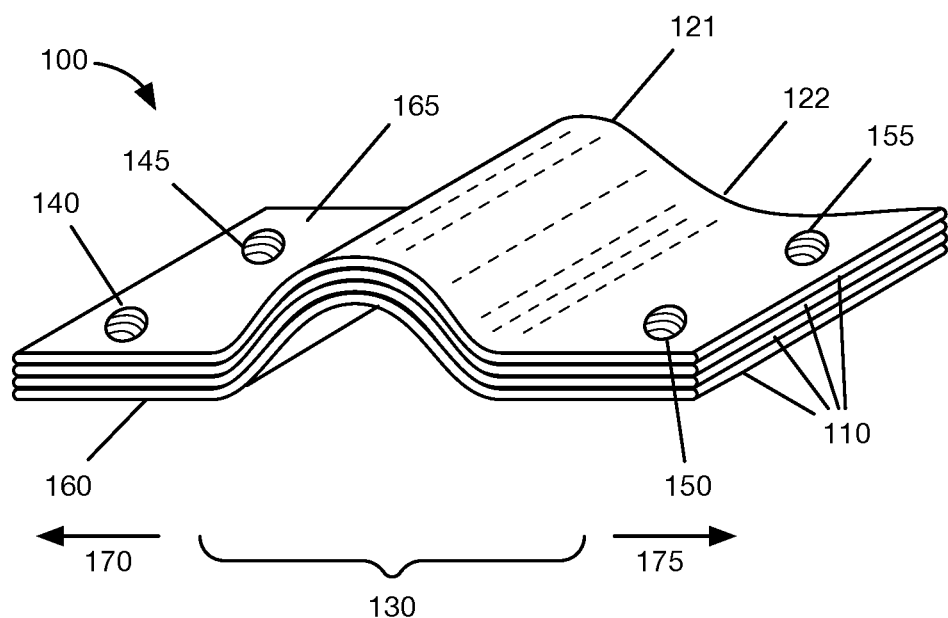
FIG. 1 is a perspective view of an exemplary embodiment of the multi-layered flexible bus bar, without binding.

Unless defined otherwise, all technical and scientific terms used herein have the same meaning as those commonly understood to one of ordinary skill in the art to which this invention pertains. Although any known methods, devices, and materials may be used in the practice or testing of the invention, the methods, devices, and materials in this regard are described herein.

Some Selected Definitions

Unless stated otherwise, or implicit from context, the following terms and phrases include the meanings provided below. Unless explicitly stated otherwise, or apparent from context, the terms and phrases below do not exclude the meaning that the term or phrase has acquired in the art to which the term or phrase pertains. The definitions are provided to aid in describing particular embodiments of the aspects described herein, and are not intended to limit the claimed invention, because the scope of the invention is limited only by the claims. Further, unless otherwise required by context, singular terms shall include pluralities and plural terms shall include the singular.

As used herein the term "comprising" or "comprises" is used in reference to compositions, methods, and respective component(s) thereof, that are essential to the invention, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

Other than in the operating examples, or where otherwise indicated, all numbers expressing quantities used herein should be understood as modified in all instances by the term "about." The term "about" when used in connection with percentages may mean ±1%.

In embodiments of the disclosure, terms such as "about," "approximately," and "substantially" may include traditional rounding according to significant figures of the numerical value.

The singular terms "a," "an," and "the" include plural referents unless context clearly indicates otherwise. Similarly, the word "or" is intended to include "and" unless the context clearly indicates otherwise. Thus, for example, references to "the method" includes one or more methods, and/or steps of the type described herein and/or which will become apparent to those persons skilled in the art upon reading this disclosure and so forth.

Although methods and materials similar or equivalent to those described herein may be used in the practice or testing of this disclosure, suitable methods and materials are described below. The term "comprises" means "includes." The abbreviation, "e.g.", is derived from the Latin exempli gratia, and is used herein to indicate a non-limiting example. Thus, the abbreviation "e.g." is synonymous with the term "for example."

To the extent not already indicated, it will be understood by those of ordinary skill in the art that any one of the various embodiments herein described and illustrated may be further modified to incorporate features shown in any of the other embodiments disclosed herein.

The following examples illustrate some embodiments and aspects of the invention. It will be apparent to those skilled in the relevant art that various modifications, additions, substitutions, and the like may be performed without altering the spirit or scope of the invention, and such modifications and variations are encompassed within the scope of the invention as defined in the claims which follow. The following examples do not in any way limit the invention.

General Construction

Referring to FIG. 1, a bus bar 100 is illustrated according to a preferred embodiment of the invention. The bus bar 100 is constructed by stacking multiple thin, sheets 110 of flexible conductive material, each bent to form radiused curve 120, radiused curve 121 and radiused curve 122 in a central portion 130 of the rectangular sheet 110. As formed, a central portion 130 of sheets 110 forms a shape generally in the form of a half-sine wave, or inverted U.

Sheets 110 are formed from sheet material that is preferably highly electrically conductive, and also flexible and/or elastic. In some embodiments, sheets 110 will be formed from metal sheeting, such as copper Sheeting or aluminum sheeting. Preferably, sheets 110 may be formed from copper with nickel plating, or copper with tin plating. In some embodiments, the metal sheet from which sheets 110 are formed will have a thickness of 0.010 inches. Thus, a bus bar 100 formed from four of such stacked sheets grouped tightly together, may have a total stack thickness of 0.040 inches. In other embodiments, the thickness of each of sheets 110 will be in the range of 0.008 inches and 0.020 inches; thus for bus bar embodiments formed from two to six sheets, may have a total thickness in the range of 0.016 to 0.120 inches. While thinner sheets may be used, in many embodiments it may be necessary to use a large number of layers to achieve desired levels of conductivity or current handling capacity. While thicker sheets may be used, resulting reduction in flexibility may be disadvantageous in some applications.

In the embodiment of FIG. 1, sheets 110 are stacked conductive sheets that are generally rectangular in shape, although it is contemplated and understood that alternative forms may be utilized. In preferred embodiments, sheets 110 are each formed from a common material with common thickness, such that each of sheets 110 may be cut from a single larger piece of sheet stock; however, in other embodiments, sheets 110 may vary in thickness even within a single assembles bus bar component.

One or more mounting points for securing bus bar 100 to a PCB or other structure can be formed on each side of central portion 130. For example, a series 140 of holes are formed in each of sheets 110 in positions that are aligned above one another when sheets 110 are stacked, providing open communication from a bottom side 160 of the bus bar 100 to a top side 165 on side 170 of central portion 130. A second series 145 of holes is also formed in each of sheets 110 in another aligned position on side 170 of central portion 130, similarly to series 140. A third series 150 and fourth series 155 of through holes are formed on side 175 of central portion 130, analogously to series 140 and second series 145.

Upon installation, bus bar 100 may be secured to a PCB or other structure, by passage of threaded conductive terminals through series 140, second series 145, third series 150 and 155, with a bolt, PCB or like structure on either side of each terminal to sandwich sheets 110 together and provide a conductive pathway between the terminals. Such an arrangement provides a mechanism for attachment that is physically robust, reliable, low cost, readily installed and uninstalled, and highly electrically conductive.

While bus bar 100 is illustrated with two mounting points on each side, it is contemplated and understood that in other embodiments, differing numbers of mounting points may be utilized, including, without limitation: one mounting point and associated series of holes on each side of central portion 130, three mounting points and associated series of holes on each side, or four mounting points and associated series of holes on each side. Further, the illustrated mounting points need not be the sole mechanism for physical and/or electrical connection with bus bar 100.

To the extent multiple sheets 110 have a defined thickness and are stacked tightly together, the precise shape of radiused curve 120, radiused curve 121 and radiused curves 122 may vary slightly between sheets 110, resulting in a slightly different distance along each sheet 110 between, e.g., series 140 and third series 150, or between second series 145 and fourth series 155. In some embodiments, with a limited number of sheets 110 formed from thin material, the difference in distance between mounting holes amongst the various layers may be negligible or within tolerances, such that each of sheets 110 may be formed with identical geometries. However, in other embodiments, it may be desirable to utilize slightly differing geometries amongst sheets 110—particularly with respect to the distance between mounting holes on side 170 and side 175—in order to provide precise alignment of series 140, second series 145, third series 150 and fourth series 155 through all of sheets 110.

Once mounted, bus bar 100 can provide a low-resistance, high current capacity electrical interconnect between side 170 (and mounting points associated with series 140 and second series 145) and side 175 (and mounting points associated with third series 150 and fourth series 155). Furthermore, radiused curve 120, 121 and 122 in central portion 130 provides a bus bar 100 that may exhibit a significant degree of physical pliability and elasticity, including variability in the distance between series 140 and second series 145 on the one hand, and third series 150 and fourth series 155 on the other. One benefit of such an arrangement is during installation of bus bar 100. Radiused curve 120, 121 and 122 may be flexed to provide a desirable degree of freedom when passing terminals or other mounting structures through series 140, second series 145, third series 150 and fourth series 155. This may be particularly beneficial to the extent that bus bar 100 is utilized to connect two physically separate devices, such as separate battery packs mounted independently within a device.

Also, to the extent bus bar 100 is utilized within a system that may undergo movement, vibration or physical shock during use, radiused curve 120, 121 and 122 may act to absorb such shock, vibration or independent movement as to independent devices connected by bus bar 100. For example, in an electric vehicle having two battery system components connected by bus bar 100, during movement the two battery system components may vibrate, shake or otherwise move with some degree of independence from one another. The combination of multiple thin layers formed from sheets 110 (each of which may exhibit significant pliability and/or elasticity), coupled with radiused curve 120, 121 and 122 formed in central portion 130, may provide a desirable degree of overall pliability and elasticity for the assembled bus bar 100, thus reducing physical stress transmitted to mounting terminals and/or PCBs to which sheets 110 is mounted, and improving interconnect reliability.

Figure 2:
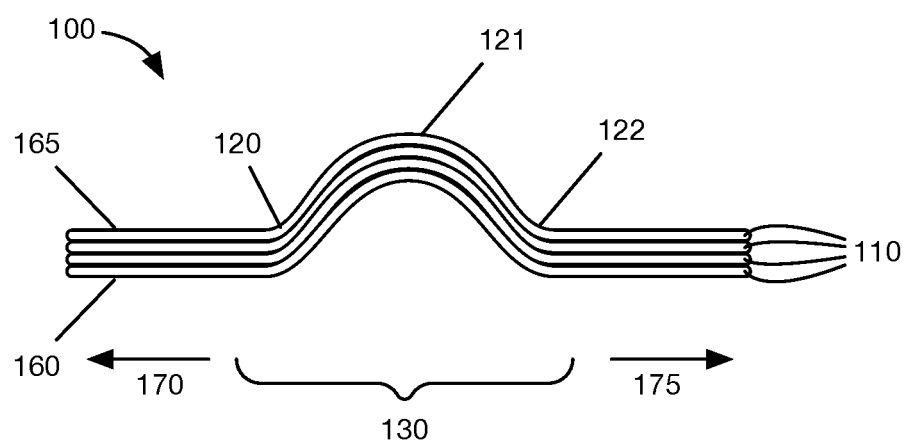
FIG. 2 is a side elevational view of the bus bar of FIG. 1, illustrating the radiused bends formed in a central or middle portion of each layer.

FIG. 2 illustrates a side view of bus bar 100.

Figure 3:
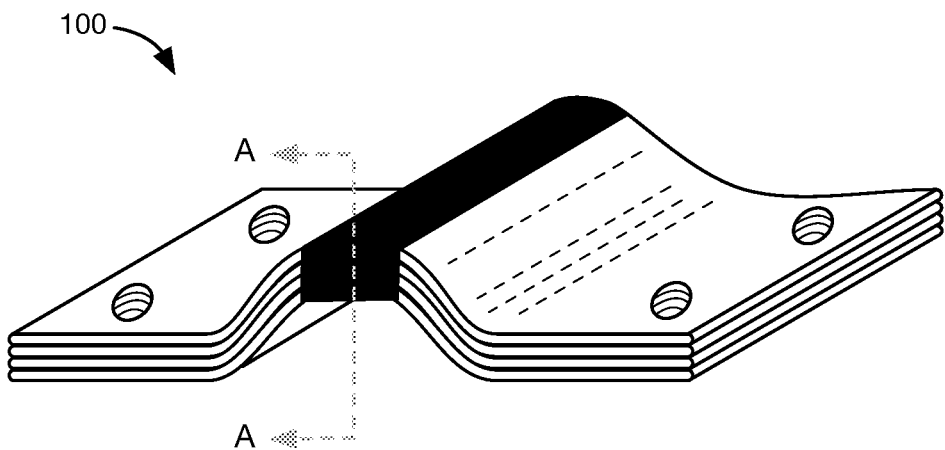
FIG. 3 is a perspective view of a multi-layered flexible bus bar with heat shrink thermoplastic binding.
Figure 4:
FIG. 4 is a cross-sectional view taken along line A-A of FIG. 3, showing the stacking of individual layers and the central heat shrink region.
Figure 5:
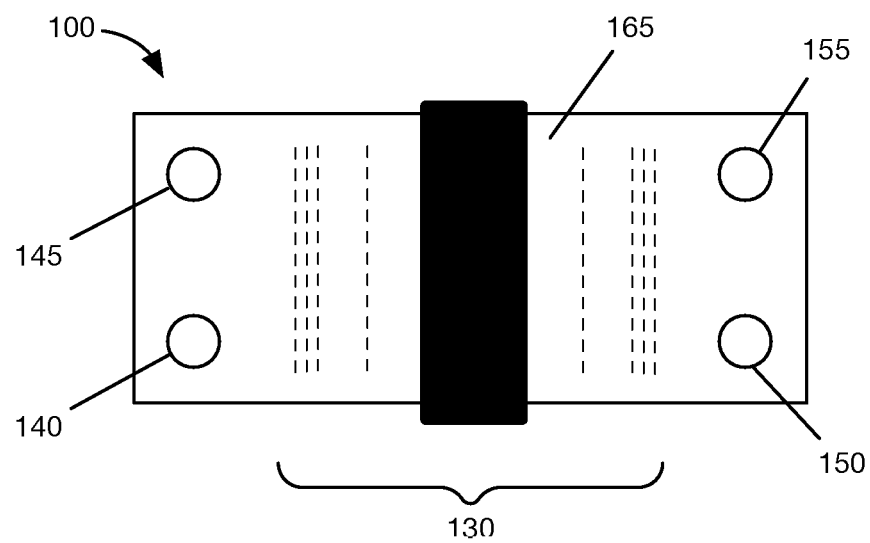
FIG. 5 is a top plan view of the bus bar, illustrating laser-cut apertures for direct mounting to PCB power terminals.

In some embodiments, it may be desirable to secure sheets 110 together prior to installation. This may help prevent sheets 110 from separating during handling. One construction that may be used to secure sheets 110 together is illustrated in FIG. 3. FIG. 3 is a perspective view of bus bar 100, akin to that of FIG. 1. However, band 300 is wrapped around a portion of sheets 110, preferably including at least some of central portion 130. Wrap 300 may be formed from heat shrink thermoplastic, such that it may be readily applied and then heated to tight up around radiused curve 121, thereby securing sheets 110 together. Because heat shrink thermoplastic is flexible, band 300 has minimal impact on the ability of bus bar 100 and radiused curve 121 to flex, thereby maintaining the ability of bus bar 100 to absorb vibration and shock, and provide some freedom of movement during installation of bus bar 100 in a system. Adhesive-backed heat shrink may be used in some embodiments to inhibit movement of band 300. FIG. 4 illustrates cross section A-A, with band 300 wrapping closely around a portion of sheets 110. FIG. 5 illustrates a top plan view of bus bar 100, with band 300 wrapped around radiused curve 121.

In other embodiments, alternative structures may be utilized to hold sheets 110 together, such as tape (which may be, e.g., an insulative tape wrapped around sheets 110 akin to band 300), adhesive (e.g. a flexible silicon adhesive), or a mechanical fastener (such as a clamp). Also, such structures (whether e.g. heat shrink, tape, adhesive, or mechanical fasteners) may be applied to portions of the flexible bus bar other than the central portion. For example, heat shrink may be wrapped around radiused curve 120 and radiused curve 122, leaving radiused curve 121 free for movement of layers relative to one another. In other embodiments, heat shrink or some other fastener means may be applied to a portion of each of side 170 and side 175, which does not interfere with mounting holes 140, 145, 150, 155.

Figure 6:
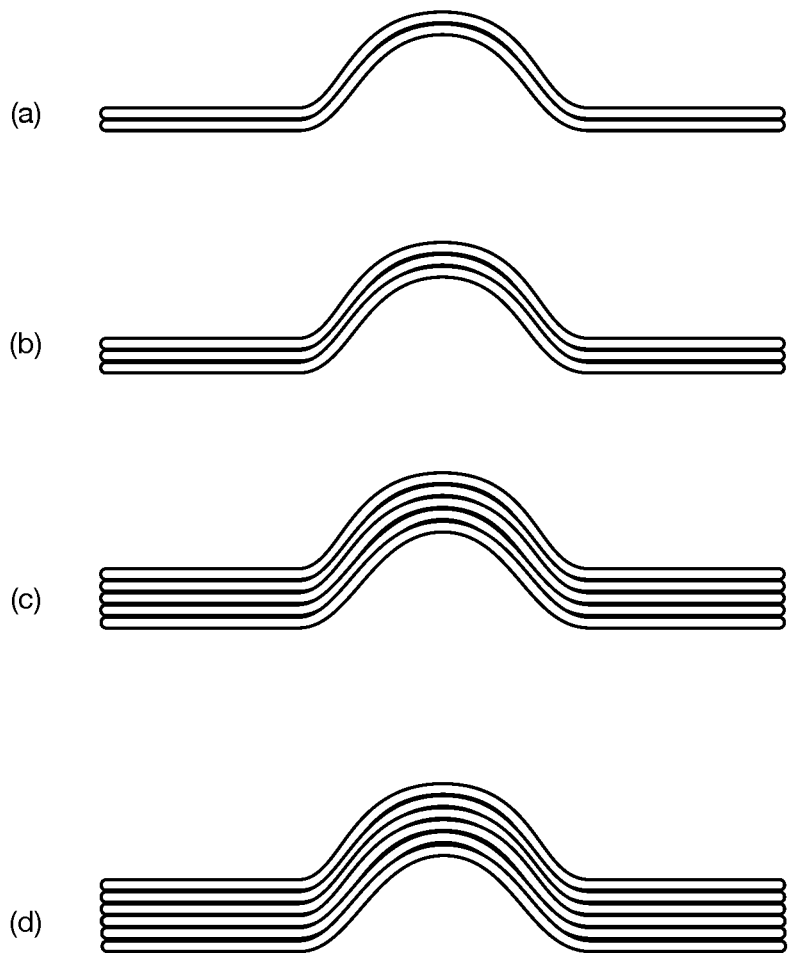
FIG. 6 is a side view of various embodiments having differing numbers of layer.

While the depicted embodiment shows four layers, it should be understood that the number of layers is not limiting, and can be varied based on the desired electrical and mechanical properties. For example, FIG. 6 illustrates, in side view, alternative embodiments can have 2 layers (FIG. 6(*a*)), 3 layers (FIG. 6(*b*)), 5 layers (FIG. 6(*c*)), or 6 layers (FIG. 6(*d*)). Other numbers of layers may also be utilized, depending on factors such as the desired current capacity and other electrical characteristics of the assembled bus bar, desired mechanical characteristics of the assembled bus bar, characteristics of the material used for sheets 110, and prioritization of component complexity.

Also, while the embodiments of FIGS. 1-6 illustrate three radiused curves formed in sheets 110, forming a shape generally akin to a half sinusoid for central portion 130, it is contemplated and understood that in other embodiments, differing numbers and types of curves can be formed in sheets 110. Curves may have differing radii. Some or all of the curves may be very abrupt, akin to a crease or fold, characterized by a radius that approaches zero, thereby facilitating an immediate directional transition in the material.

Figure 7:
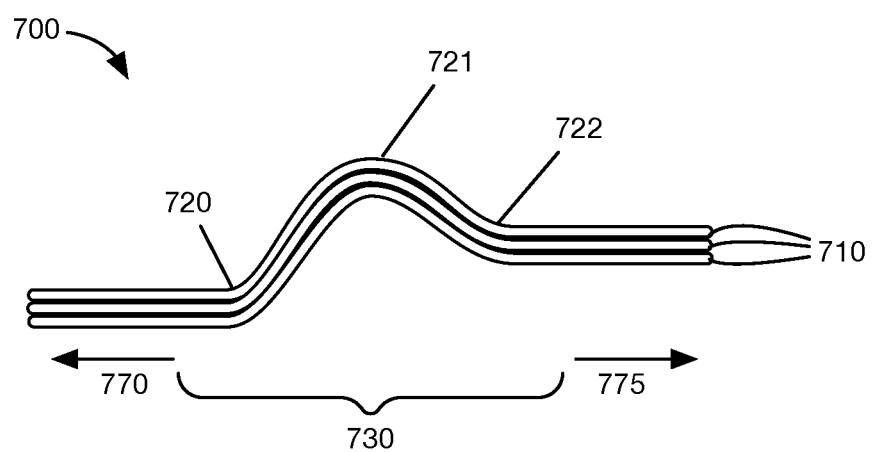
FIG. 7 is side view of an embodiment in which PCB mounting points are offset from one another.

In the embodiment of FIGS. 1-6, bus bar 100 is formed such that side 170 and side 175 are coplanar, facilitating interconnect of coplanar PCBs (or at least, PCBs having coplanar interconnects). However, in other embodiments, sides having mounting points need not be coplanar. For example, FIG. 7 illustrates a side view of an embodiment of bus bar 700 having three layers of rectangular sheets 710, each formed with a first radiused curve 720, a second radiused curve 721 and a third radiused curve 722 in central region 730. The length of material on either side of radiused curve 721 may differ, and/or the radii or lengths of radiused curves 720 and 722 may differ, such that side 770 occupies a plane that is parallel with, but offset from, side 775. As such, bus bar 700 provides a single-component interconnect between two PCBs or other components installed in offset positions. Further, in yet other embodiments, side 770 need not be coplanar with side 775, e.g. for flexible, single-component interconnect of components installed at angles to one another.

The embodiments of FIGS. 1-7 illustrate layers each formed with three curves in a central portion thereof. Such three curve embodiments may, in some embodiments, provide an optimal balance of e.g. ease of fabrication, mechanical elasticity and other characteristics, while also being suited for installation against a generally flat structure, with the central curved portion of the bus bar extending physically in one direction from coplanar ends. However, in other embodiments, differing numbers of curves may be utilized, to form differing shapes. The number and shape of curves may be selected based on factors including, without limitation, the desired physical characteristics of the bus bar.

Figure 8:
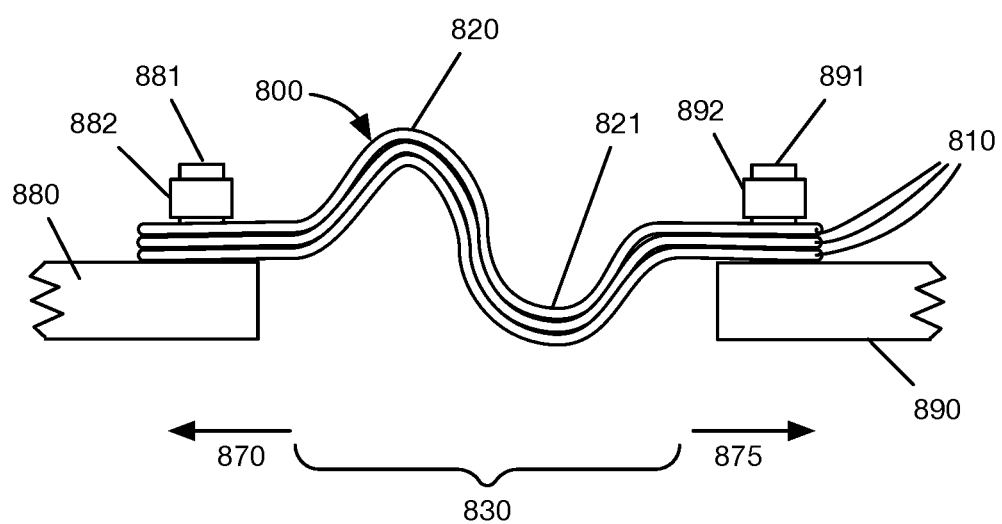
FIG. 8 is a side view of an embodiment with a sinusoidal curve formed in a central portion of the bus bar, mounting to PCB on each end via a terminal post and fastener.

FIG. 8 illustrates an embodiment of bus bar 800 having three layers 810. A central portion 830 spans an open area between PCB 880 and PCB 890. In central portion 830, bus bar 800 is curved to form a full sinusoidal shape, including upward U curve 820 extending upward from a plane occupied by side 870 and side 875, and downward U curve 821 extending downward from a plane occupied by side 870 and side 875. On side 870, bus bar 800 is secured to PCB 880 via threaded mounting post 881 and threaded fastener 882. On PCB 880, bus bar 800 is secured to PCB 890 via threaded mounting post 891 and threaded fastener 892. The shape of bus bar 800 in central portion 830 may provide, e.g., a high degree of elasticity and/or flexibility, enabling significant movement of PCB 880 and PCB 890 relative to one another, with minimal mechanical stress being applied to threaded mounting post 881 and threaded mounting post 891 (and in turn, PCB 880 and PCB 890).

Manufacturing and Formation

Figure 9:
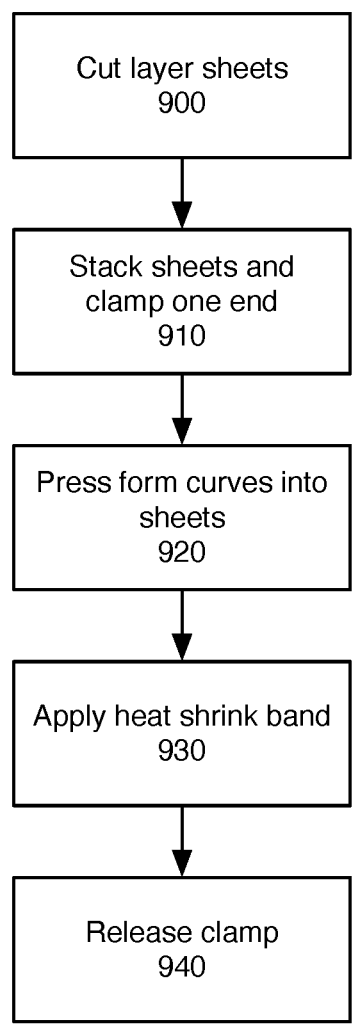
FIG. 9 is a flowchart of a process for fabrication of a flexible bus bar.

The flexible bus bar embodiments described herein are amenable to a variety of fabrication techniques. FIG. 9 illustrates an exemplary method of fabrication.

In step 900, sheets 110 are cut from sheet stock. In some embodiments, sheets 110 may be fabricated by conventional approaches, such as stamping of sheets 110 and drilling of holes for series 140, second series 145, third series 150 and fourth series 155.

In other embodiments, the bus bar sheets 110 may be formed entirely via laser cutting from a larger sheet of conductive material, such as a copper sheet or aluminum sheet. The utilization of laser cutting allows for intricate geometries (both sheet perimeter and mounting points) and customizable designs to be formed in the bus bar, in a single cutting operation. Laser cutting also permits fabrication of a variety of different part geometries (e.g. multiple flexible bus bar parts having different size, shapes or other geometries), using a single fabrication station, with little or no fixed tooling costs.

In step 910, sheets 110 are stacked in an aligned manner, and one end is clamped. In some embodiments, sheets 110 will be clamped such that at least one edge of each sheet is aligned with the like edge of the other sheets. In some embodiments, mounting holes (e.g. series 140 and second series 145) may be aligned vertically amongst each of sheets 110.

Figure 10:
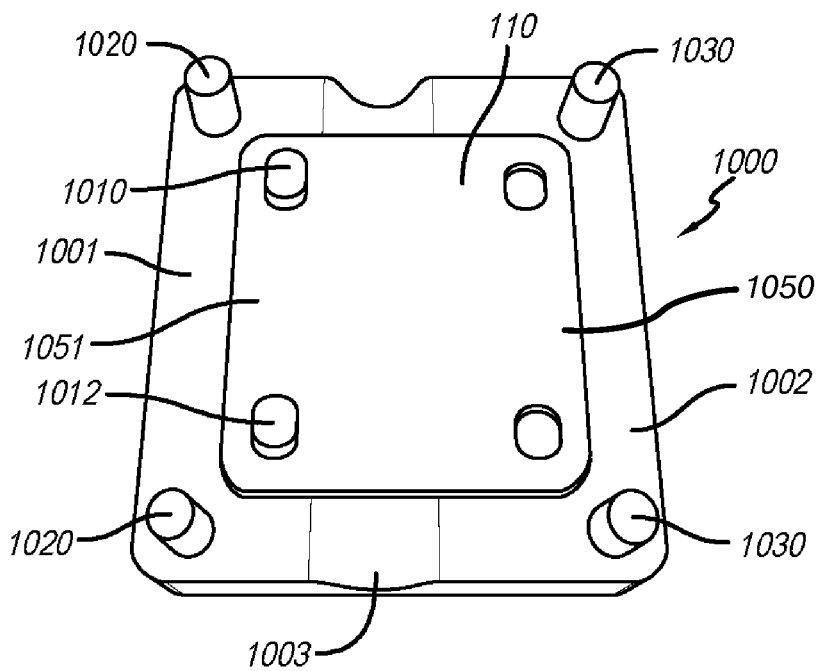
FIG. 10 is a perspective view of a forming tool base with bus bar sheet material stacked thereon.
Figure 11:
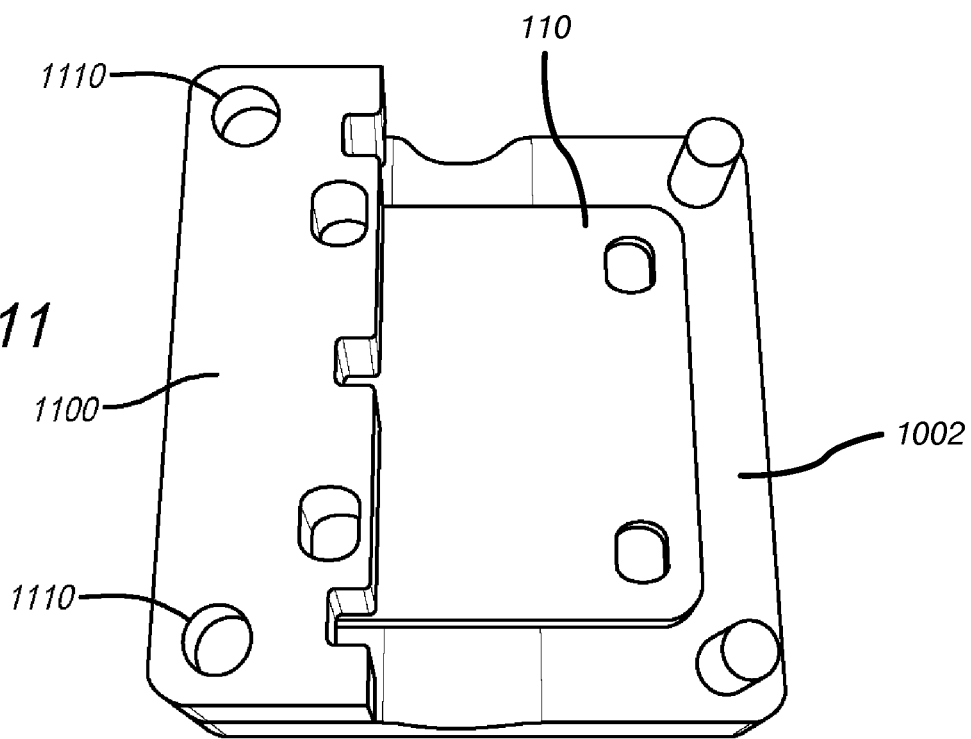
FIG. 11 is a perspective view of a forming tools base and forming tool clamp securing the stacked bus bar sheet material.
Figure 12:
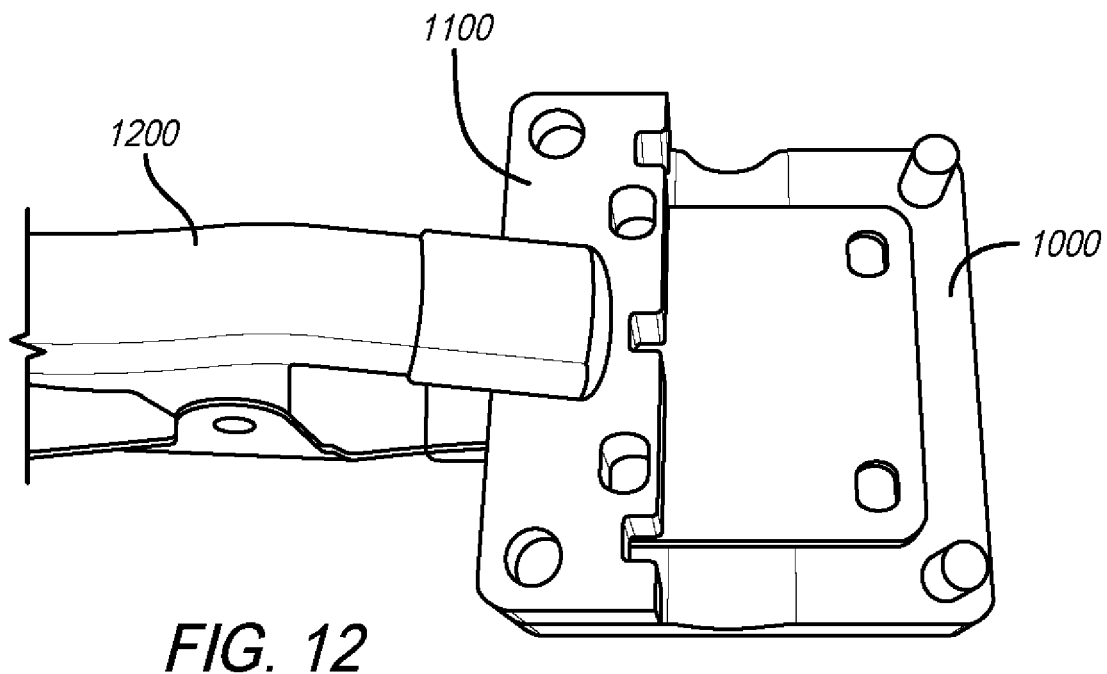
FIG. 12 is a perspective view of the assembly of FIG. 11, secured by a clamp.

FIG. 10-12 illustrate stacking and clamping step 910, in an exemplary embodiment. FIG. 10 is a perspective view of sheets 110 stacked onto a forming tool base 1000. Forming tool base 1000 includes flat side 1001, flat side 1002, and radiused curve depression 1003 extending downward from flat side 1001 and flat side 1002, longitudinally across forming tool base 1000. Alignment tabs 1010 and 1012 are integrated within forming tool base 1000, and sized to pass through series 140 and second series 145 of holes in sheets 110. Forming tool base posts 1020 and forming tool base posts 1030 are also integrated into forming tool base 1000, for subsequent mounting of additional forming tool components, as described below.

Sheets 110 are stacked on forming tool base 1000 so that series 140 of holes and series 145 of holes are mounted on alignment tabs 1010 and 1012, respectively. In FIG. 11, forming tool clamp 1100 is installed on forming tool base 1000, by passing forming tool base posts 1020 into forming tool clamp receptacles 1110. In FIG. 12, clamp 1200 compresses together forming tool base 1000 and forming tool clamp 1100 to prevent their separation. In this manner, forming tool base 1000 and forming tool clamp 1100 act to promote alignment of sheets 110 during subsequent pressing operations.

Figure 13:
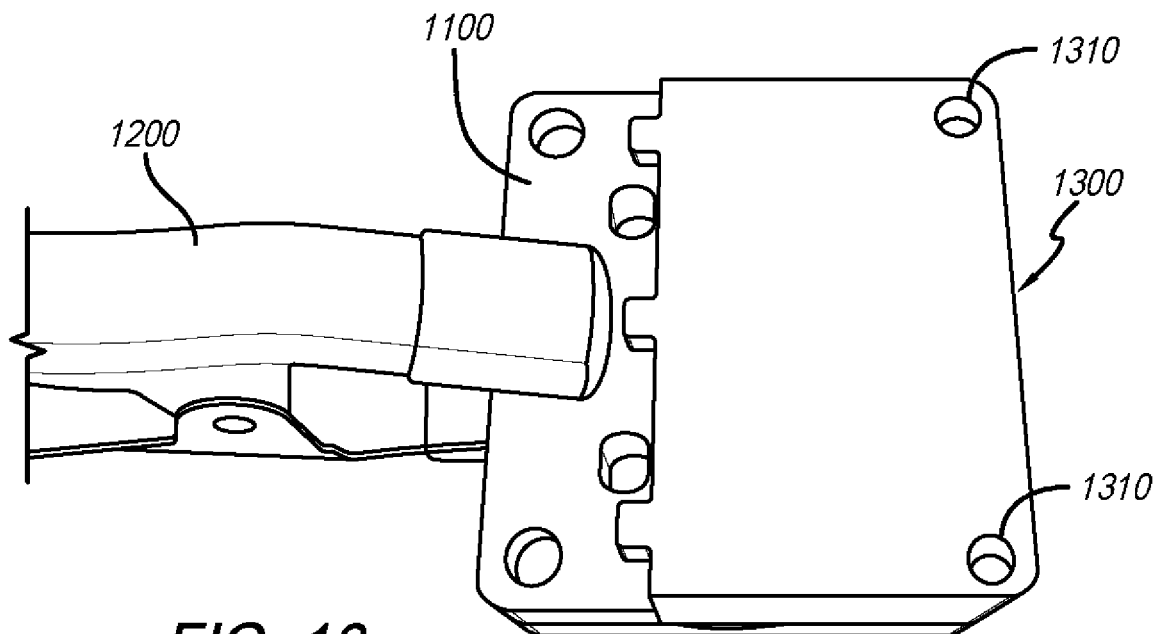
FIG. 13 is a perspective view of the assembly of FIG. 12, with a forming tool top aligned on the forming tool base.
Figure 15:
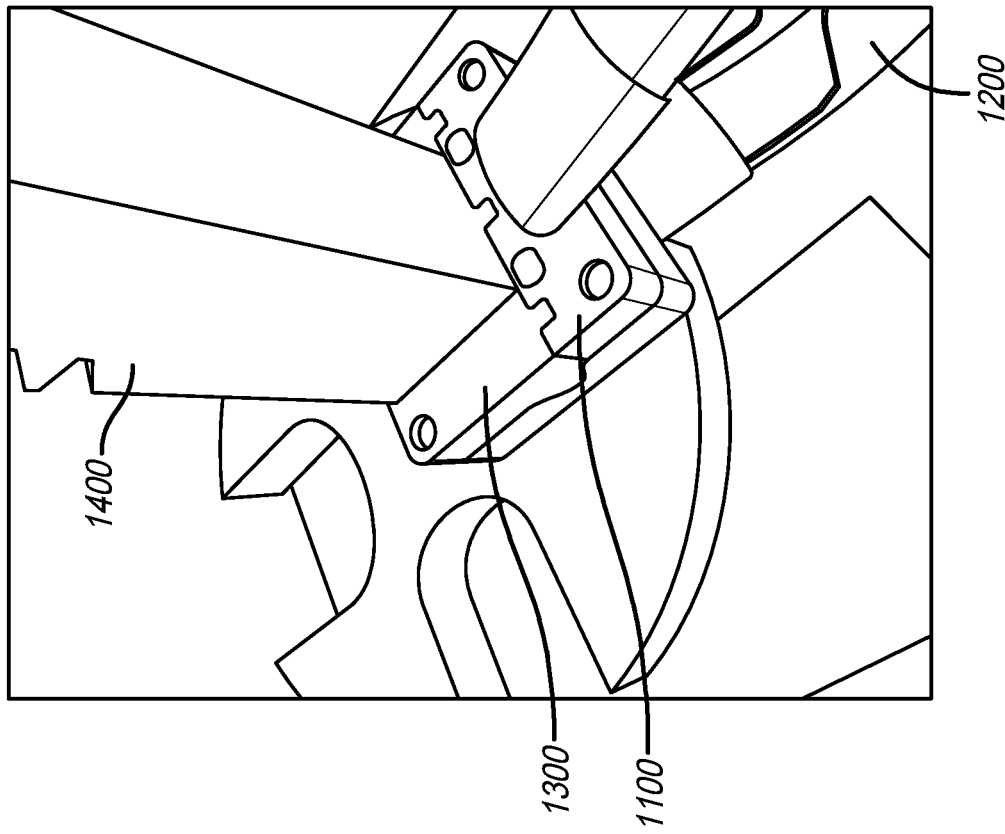
FIG. 15 is a perspective view of the assembly of FIG. 14, after force has been applied by the press.
Figure 14:
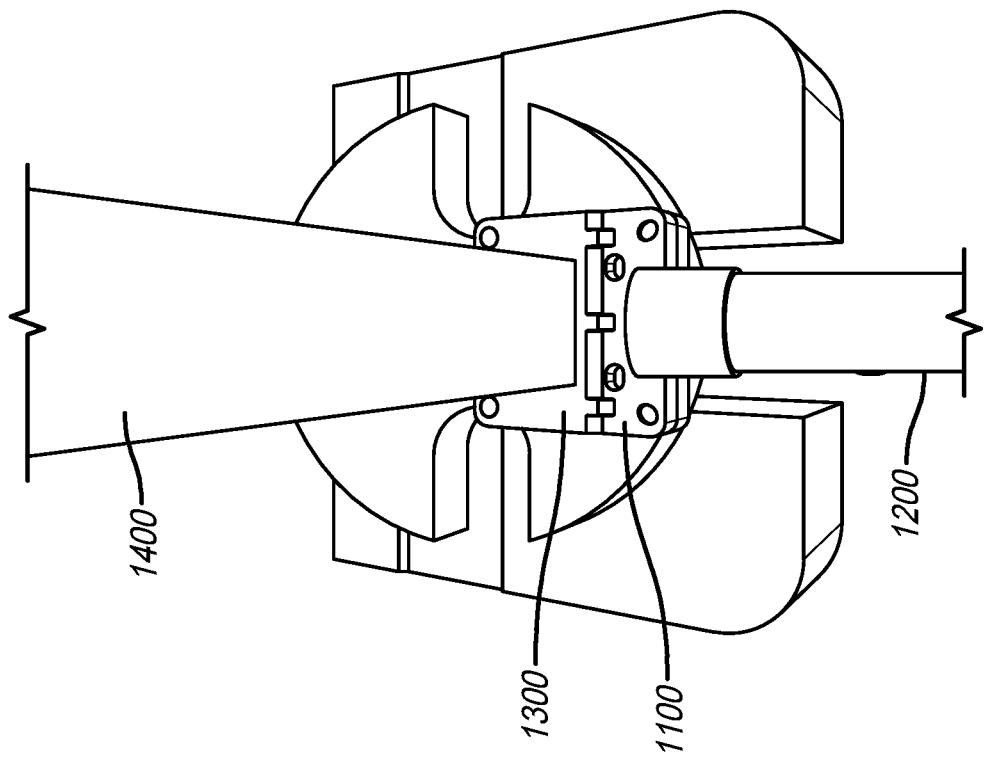
FIG. 14 is a perspective view of the assembly of FIG. 13, with a press aligned thereon.

In step 920, sheets 110 are press-formed to form radiused curve 120, radiused curve 121 and radiused curve 122. For example, in FIG. 13, forming tool top 1300 is installed on forming tool base 1000, covering sheets 110, by aligning forming tool top receptacles 1310 with forming tool base posts 1030. In FIG. 14, arbor press 1400 is positioned against forming tool top 1300, and downward force is applied. In FIG. 15, arbor press 1400 has caused forming tool top 1300 to deform sheets 110 into radiused curve depression 1003 of forming tool base 1000, thereby forming radiused curve 120, radiused curve 121 and radiused curve 122.

During the press-forming process of step 920, ends 1050 of sheets 110 are drawn in closer to ends 1051. Because ends 1050 of sheets 110 can move freely relative to one another during step 920, and because ends 1051 are clamped together, a desired curve may be formed in sheets 110 without stretching or otherwise deforming the bus bar mounting holes (e.g. series 140 and second series 145), even when sheets 110 are formed from a relatively soft material such as copper.

Once sheets 110 are pressed in step 920, the curves introduced into sheets 110 may not only provide controlled flexibility and/or elasticity in the formed part, but may also aid in keeping sheets 110 together. However, as described above, it may be desirable to provide additional means of holding sheets 110 together, particularly prior to installation (after which, mounting posts or other means of securing the flexible bus bar to PCBs may serve to retain sheets 110 in position). Thus, in step 930, heat shrink band 300 (or an alternative structure for physically securing sheets 110 to one another, as described above) is applied to the stacked, curved sheets 110, holding 110 thereby sheets together during subsequent handling and installation of bus bar 100. In step 940, clamp 1200 is released, sheets 110 are removed from the forming tool, and fabrication of the flexible bus bar 100 is complete.

Once bus bar 100 is formed, it may be mounted by, e.g., passing terminals of one PCB through mounting hole series 140 and second series 145, and passing terminals of a second PCB through mounting hole third series 150 and 155, then applying a nut or other fastener to the PCB terminals to secure bus bar 100 thereto. Such a mounting arrangement is illustrated and describe above in connection with FIG. 8, but can be readily utilized with flexible bus bar embodiments having any curve configuration.

The above disclosures and descriptions are exemplary in nature, and not intended to limit the scope of the invention. Any person skilled in the art given the present disclosures could design variations and additional embodiments of the same invention based on these disclosures, which are all covered by this application for letters patent.

Although some of various drawings illustrate a number of logical stages in a particular order, stages which are not order dependent may be reordered and other stages may be combined or broken out. Alternative orderings and groupings, whether described above or not, may be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

The invention claimed is:

1. A flexible bus bar comprising:
   a plurality of stacked conductive sheets;
   each of said stacked conductive sheets having a plurality of curves formed in a central portion thereof; and
   each of said stacked conductive sheets having at least a first mounting point on a first side of the central portion, and at least a second mounting point on a second side of the central portion opposite the first side, each of the first and second mounting points configured for electrically-conductive attachment to a printed circuit board (PCB); and
   a coupling component configured to secure the stacked conductive sheets together at a portion of the stacked conductive sheets between the first mounting point and the second mounting point prior to installation;
   wherein said stacked conductive sheets are each separable until being secured together by the coupling component prior to installation and are further sandwiched together upon installation by mounting hardware at the first mounting point and the second mounting point.

2. The flexible bus bar of claim 1, in which the plurality of stacked conductive sheets are formed from metal.

3. The flexible bus bar of claim 2, in which the plurality of stacked conductive sheets consist of copper sheeting.

4. The flexible bus bar of claim 1, in which the first mounting points comprise a first set of aligned holes passing through a portion of the stacked conductive sheets on the first side of the central portion.

5. The flexible bus bar of claim 4, in which the second mounting points comprise a second set of aligned holes passing through a portion of the stacked conductive sheets on the second side of the central portion;
   whereby a terminal mounted to a first PCB may be passed through the first set of aligned holes for acceptance of a fastener to sandwich together the plurality of stacked conductive sheets at the first side and secure the first side to the first PCB; and whereby a terminal mounted to a second PCB may be passed through the second set of aligned holes for acceptance of a fastener to sandwich together the plurality of stacked conductive sheets at the second side and secure the second side to the second PCB.

6. The flexible bus bar of claim 1, in which the plurality of curves comprises three curves.

7. The flexible bus bar of claim 1, in which the plurality of curves comprises three curves, formed such that the first side of the flexible bus bar is coplanar with the second side of the flexible bus bar.

8. The flexible bus bar of claim 7, in which the central portion extends in a single direction relative to a plane occupied by the first side and second side of the bus bar.

9. The flexible bus bar of claim 1, in which the plurality of curves comprises three curves, formed such that the first side of the flexible bus bar occupies a first plane, and the second side of the flexible bus bar occupies a second plane, and the first plane is parallel to and offset from the second plane.

10. The flexible bus bar of claim 1, wherein the central portion is curved to form a sinusoid or portion thereof.

11. The flexible bus bar of claim 1, wherein the central portion is curved to comprise a U shape form.

12. The flexible bus bar of claim 1, wherein the plurality of stacked conductive sheets comprises four conductive sheets.

13. The flexible bus bar of claim 1, wherein the plurality of stacked conductive sheets comprises a number of conductive sheets between 2 and 6.

14. The flexible bus bar of claim 1, wherein each of the plurality of stacked conductive sheets is 0.010 inches in thickness.

15. The flexible bus bar of claim 1, wherein each of the plurality of stacked conductive sheets has a thickness in the range of 0.008 inches to 0.020 inches.

16. The flexible bus bar of claim 1, further comprising a first PCB secured to the first mounting point, and a second PCB secured to the second mounting point.

17. The flexible bus bar of claim 1, wherein the coupling component further comprises a heat shrink thermoplastic wrapping together the portion of the stacked conductive sheets between the first mounting point and the second mounting point.

18. The flexible bus bar of claim 1, wherein the coupling component further comprises one or more of: a flexible band, a tape, adhesive, or a mechanical fastener.

19. The flexible bus bar of claim 1, wherein the portion of the stacked conductive sheets secured between the first mounting point and the second mounting point comprises at least a part of the central portion.

20. The flexible bus bar of claim 1, wherein each of said stacked conductive sheets further comprises one or more of: at least a third mounting point on the first side of the central portion or at least a fourth mounting point on the second side of the central portion.

* * * * *